US008132529B2

(12) United States Patent
Wells

(10) Patent No.: US 8,132,529 B2
(45) Date of Patent: Mar. 13, 2012

(54) APPLICATOR FOR AUTOMATIC DISCHARGE OF A CORROSION PREVENTATIVE TO A SENSOR SURFACE

(75) Inventor: Russ A. Wells, Canton, OH (US)

(73) Assignee: The Timken Company, Canton, OH (US)

(*) Notice: Subject to any disclaimer, the term of this patent is extended or adjusted under 35 U.S.C. 154(b) by 991 days.

(21) Appl. No.: 12/056,685

(22) Filed: Mar. 27, 2008

(65) Prior Publication Data

US 2008/0213480 A1 Sep. 4, 2008

Related U.S. Application Data

(63) Continuation-in-part of application No. PCT/US2006/038004, filed on Sep. 27, 2006.

(51) Int. Cl.
*B05C 11/00* (2006.01)
*B05D 5/00* (2006.01)
*G01B 7/14* (2006.01)

(52) U.S. Cl. .................. 118/712; 427/256; 324/207.11; 324/207.26

(58) Field of Classification Search .................. 118/712; 427/256; 324/207.11–207.26
See application file for complete search history.

(56) References Cited

U.S. PATENT DOCUMENTS 4,151,314 A 4/1979 Debenham
4,359,965 A 11/1982 Bridges, Sr.
5,039,942 A * 8/1991 Buchschmid et al. ........ 324/174
5,121,054 A * 6/1992 Phillips et al. ................ 324/160
5,195,831 A * 3/1993 Faye et al. ..................... 384/448
5,351,388 A * 10/1994 Van Den Berg et al. ..... 29/602.1
5,563,510 A * 10/1996 Gorrell et al. ................. 324/174
5,670,874 A * 9/1997 Miyazaki et al. ............. 324/174
6,107,609 A * 8/2000 Strodtbeck et al. ........ 219/446.1

(Continued)

FOREIGN PATENT DOCUMENTS

DE 2606674 5/1988

(Continued)

OTHER PUBLICATIONS

International Search Report for International application No. PCT/US2006/038004 international filing date of Sep. 27, 2006.

(Continued)

*Primary Examiner* — Dah-Wei Yuan
*Assistant Examiner* — K Kurple
(74) *Attorney, Agent, or Firm* — Polster, Lieder, Woodruff & Lucchesi, L.C.

(57) ABSTRACT

An applicator and method of discharging a corrosion preventative. The applicator controllably and uniformly applies a corrosion preventative to a surface that has a sensor instrument mounted thereon. The applicator comprises a reservoir block that defines an interior reservoir that is configured to contain an amount of the corrosion preventative. The applicator further comprises a plate attached to the top of the reservoir block. The plate includes a sensor guide that extends outward from the top surface which is configured to engage the surface. Discharge tubes attach to the plate and extend outward from the plate in a pattern around the sensor instrument, wherein the tubes operatively communicate with the reservoir. A proximity sensor which is positioned within the sensor bore is configured to sense and to signal a presence of the sensor instrument positioned within the sensor bore. In response to the signaling of the sensor instrument position within the sensor bore, the discharge tubes uniformly discharge controlled amounts of the corrosion preventative onto the surface.

13 Claims, 3 Drawing Sheets

U.S. PATENT DOCUMENTS

| | | | | |
|---|---|---|---|---|
| 6,354,153 | B1 * | 3/2002 | Weiblen et al. | 73/756 |
| 6,511,707 | B1 | 1/2003 | MacDonald | |
| 2002/0196014 | A1 * | 12/2002 | Iwase et al. | 324/207.2 |
| 2004/0150392 | A1 * | 8/2004 | Nakano et al. | 324/207.2 |
| 2010/0231031 | A1 * | 9/2010 | Takahashi et al. | 303/5 |
| 2010/0271004 | A1 * | 10/2010 | Bjorn | 324/96 |

FOREIGN PATENT DOCUMENTS

| | | | |
|---|---|---|---|
| EP | 1308268 | A1 * | 6/2001 |
| EP | 2065710 | A2 * | 3/2009 |
| WO | WO2007035625 | * | 3/2007 |

OTHER PUBLICATIONS

PCT Written Opinion of the ISA for PCT/US2006/038004 international filing date of Sep. 27, 2006.

PCT/US2006/038004 Notification Concerning Transmittal of International Preliminary Report on Patentability (Chapter 1 of the Patent Cooperation Treaty) (PCT Rule 44bis.1(c)) dated Apr. 10, 2008.

* cited by examiner

APPLICATOR FOR AUTOMATIC DISCHARGE OF A CORROSION PREVENTATIVE TO A SENSOR SURFACE

CROSS-REFERENCE TO RELATED APPLICATIONS

This application is a continuation-in-part application of International Application No. PCT/US2006/038004 filed Sep. 27, 2006 which claims priority to U.S. Provisional Application No. 60/721,147 filed Sep. 27, 2005, both of which are incorporated herein by reference in their entireties.

STATEMENT REGARDING FEDERALLY SPONSORED RESEARCH

Not Applicable.

BACKGROUND

This disclosure relates to an applicator and more particularly to an applicator that applies a corrosion preventative to a surface which has a sensor instrument mounted thereon.

During installation of a sensor assembly in a housing, a corrosion preventative, such as grease, is applied to components of the sensor assembly or to components of the housing. As an example, the housing may include a bearing assembly that supports a rotating component positioned within the housing. A sensor instrument of the sensor assembly passes through a bore of the bearing assembly wherein the sensor instrument monitors variables of the rotating component. This sensor instrument, though, is sensitive to corrosion effects. The corrosion preventative is applied to components of the sensor assembly to protect the sensor instrument from the corrosion effects.

The process of applying the corrosion preventative to the surface becomes problematic when an applicator does not control the volume and/or distribution of the corrosion preventative. For example, current well-type applicators use an applicator tip to apply the corrosion preventative to the appropriate surface. These current applicators prove unreliable since these applicators apply an excessive amount or an inadequate amount of the corrosion preventative to the surface. The incorrect amount of applied corrosion preventative does not adequately protect the sensor instrument from the corrosion effects.

Additionally, other current applicators apply an uncontrolled amount of corrosion preventative to the sensor assembly wherein this uncontrolled amount contaminates other components associated with the sensor assembly by migrating onto critical surfaces of the other components. Furthermore, during handling of the sensor assembly and housing, the corrosion preventative applied in an uncontrolled manner also migrates onto the sensor instrument where the migration minimizes or voids the usefulness of the sensor instrument.

Additionally, during handling of the housing, the operator's hands contact this uncontrolled amount of corrosion preventative and then contaminate other surfaces by smearing the corrosion preventative on these other contacted surfaces. For example, the smearing of the corrosion preventative during handling of a caliper assembly of a brake hub contaminates brake components of the hub.

In the automotive industry, automobiles and light trucks of current manufacture contain many components that are acquired in packaged form from outside suppliers. The packaged components reduce the time required to assemble the vehicles and further improve the quality of the vehicles by eliminating critical adjustments from the assembly line. The sensor assemblies of these components experience many handling and shipping steps. These packaged sensor assemblies require a controlled amount of applied corrosion preventative with respect to the volume and distribution of the corrosion preventative so that the proper amount of corrosion preventative remains on the proper location of the sensor assemblies during handling and shipping.

SUMMARY OF THE DISCLOSURE

The present disclosure relates to an applicator that controllably and uniformly applies a corrosion preventative to a surface that has a sensor instrument mounted thereon. The applicator comprises a reservoir block having a top, a bottom and sides connecting the top and the bottom. The top, bottom and sides form a body that defines an interior reservoir that is configured to contain an amount of the corrosion preventative. The top includes a sensor bore extending into the body that is configured to receive the sensor instrument and includes a port that is in operative communication with the interior reservoir.

The applicator further comprises a plate attached to the top of the reservoir block. The plate has a top surface, a bottom surface and sidewalls connecting the top surface and the bottom surface. The plate includes a sensor aperture defined through the sidewall which is configured to receive the sensor instrument. The plate also includes a sensor guide that extends outward from the top surface and which is configured to engage the sensor surface.

The applicator also comprises a plurality of discharge tubes attached to the plate. The discharge tubes open out of the bottom surface of the plate to be in operative communication with the reservoir block and the port. The tubes extend outward from the top surface in a pattern around the sensor instrument.

A proximity sensor of the applicator is positioned within the sensor bore. The proximity sensor is configured to sense and to signal a presence of the sensor instrument positioned within the sensor bore. In response to the signaling of the sensor instrument position within the sensor bore, the plurality of discharge tubes uniformly discharge controlled amounts of the corrosion preventative contained in the reservoir onto the sensor surface.

BRIEF DESCRIPTION OF THE DRAWINGS

In the accompanying drawings which form part of the specification.

Corresponding reference numerals indicate corresponding parts throughout the several figures of the drawings.

DETAILED DESCRIPTION OF THE DISCLOSURE

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure.

The present disclosure relates to an applicator that applies a corrosion preventative to a surface in a predetermined pattern. The applicator can be used to apply the corrosion preventative to any appropriate surface. However, for illustrative purposes only, the surface will be described as incorporating a sensor assembly wherein the surface surrounds a sensor instrument of the sensor assembly.

The applicator of the present disclosure relates to applying the corrosion preventative to a variety of sensor technologies. In one example, the sensor instrument of the sensor assembly monitors a variety of variables relating to an object to produce an output signal for the monitored variables. These variables may include but are not limited to speed, load, temperature or vibration. In these applications, the applicator of the present disclosure applies the corrosion preventative in a controlled volume and uniform pattern to the appropriate surface to protect the sensor instrument.

Figure 1:
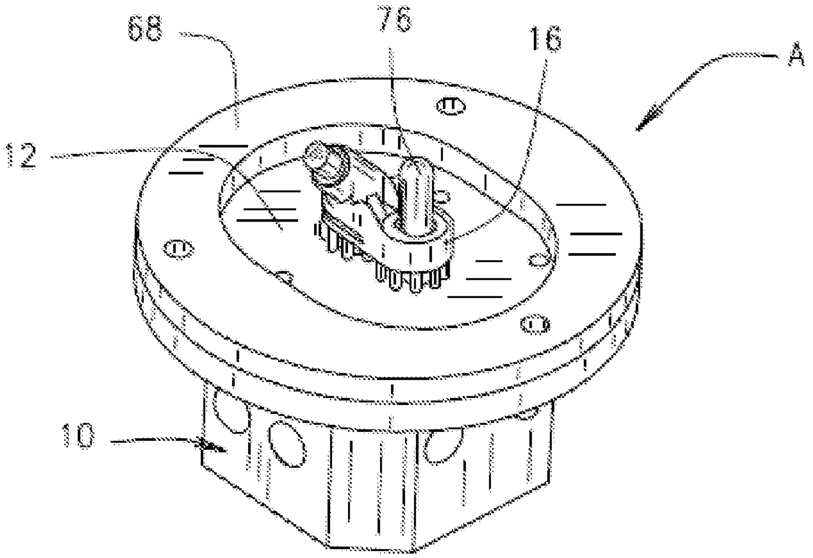
FIG. 1 is a perspective view of a discharge member and distribution member constructed in accordance with and embodying the present disclosure wherein a sensor assembly is shown engaged with a plate of the distribution member.

Referring to the drawings, an applicator A comprises a distribution member 10 and a discharge member 12 (FIG. 1). The applicator A further comprises a proximity sensor 14 (FIG. 6) positioned within the distribution member 10. As shown in FIG. 1, a sensor assembly 16 removably engages with the discharge member 12.

Figure 2:
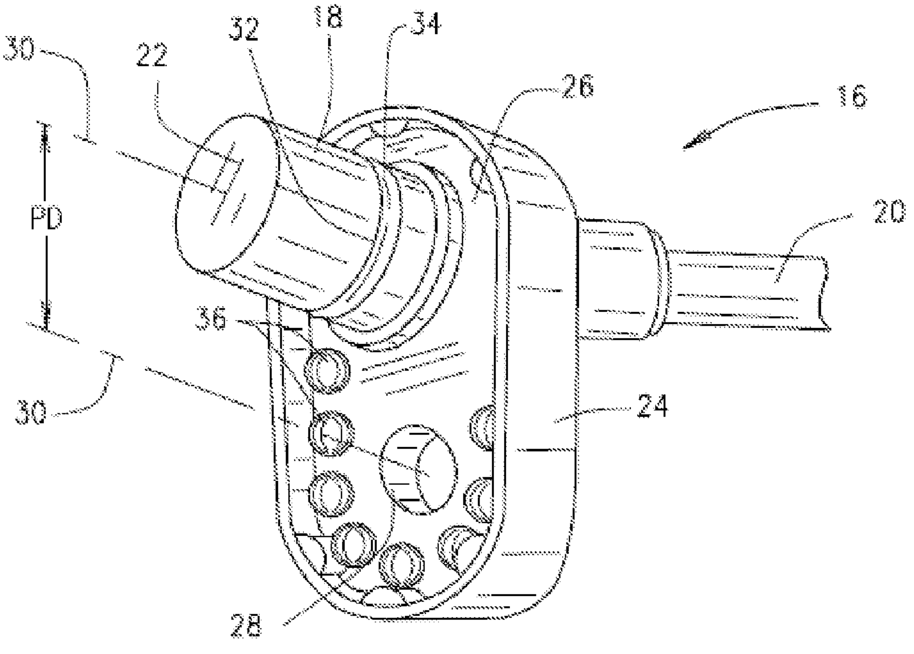
FIG. 2 is a perspective view of the sensor assembly of FIG. 1 having a sensor surface and a sensor instrument wherein a corrosion preventative is applied onto the sensor surface and around the sensor instrument in a predetermined pattern.

Turning to FIG. 2, the sensor assembly 16 comprises a sensor body 18, a flexible electrical conduit 20 emanating from a suitable grommet, a sensor instrument 22 and a collar 24. The sensor body 18 has a sensor surface 26 that includes a guide aperture 28 defined therethrough. The sensor instrument 22 extends through the sensor surface 26 such that the electrical conduit 20 and sensor instrument 22 are positioned on opposite sides of the sensor surface 26. Centerlines 30 of the guide aperture 28 and the sensor instrument 22 are spaced at a predetermined distance PD.

The sensor instrument 22 includes an annular groove 32, which receives a seal 34 to isolate the sensor instrument 22 so that contaminants do not contact the sensor instrument 22. The seal 34 can be an O-ring. However, any seal that is easily used for its intended purpose is acceptable.

The collar 24 surrounds the sensor surface 26 and extends beyond the sensor surface 26 such that the sensor surface 26 is spaced from the top edge of the collar 24. PCT Application No. PCT/US2006/036272 (published at WO 2007/035625) describes the collar 24 and is incorporated herein by reference in its entirety. FIG. 2 illustrates a corrosion preventative 36 in the form of "beads" applied to the surface of the sensor surface 26 in a predetermined pattern as will be discussed.

Figure 3:
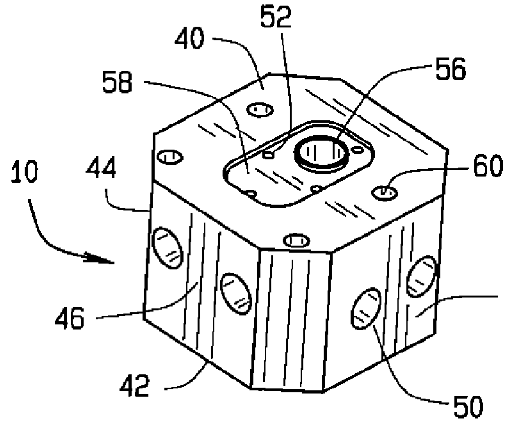
FIG. 3 is a perspective view of the distribution member of FIG. 1 illustrating a reservoir block having inlet ports and outlet ports.
Figure 6:
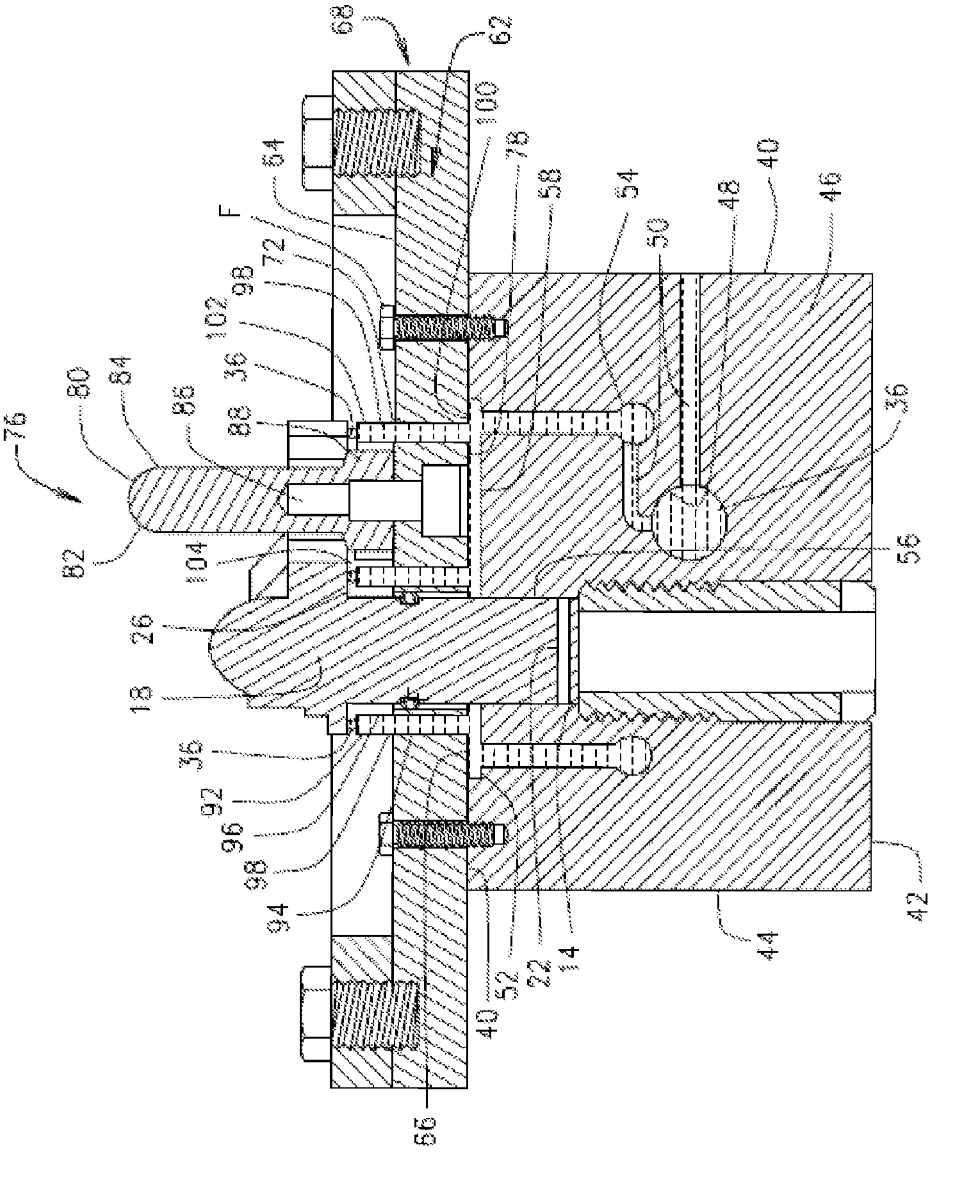
FIG. 6 is a partial cross sectional view of the connected reservoir block and the plate of FIG. 5 and the sensor assembly further illustrating the sensor guide and the discharge tubes.

Turning to FIG. 3 and referring to FIG. 6, the distribution member 10 includes a reservoir block 38 having a top 40, a bottom 42 and sides 44 extending between the top 40 and the bottom 42. The top 40, bottom 42 and sides 44 form a body 46 that defines an interior reservoir 48 (FIG. 6) which is configured to hold an amount of the corrosion preventative 36. The reservoir block 38 can be made from polypropylene, metal or other appropriate material. Further, the reservoir block 38 can have a variety of shapes such as elliptical, oval, circular, triangular, square, rectangular or any other appropriate configuration. As shown, the reservoir block 38 has an octagonal shape. The reservoir block 38 can be of any size to accommodate the corrosion preventative 36 of any material composition and of any volume.

The reservoir block 38 also includes inlet ports 50 in the sides 44 and outlet ports 52 in the top 40. The reservoir 48 is positioned between the inlet ports 50 and the outlet ports 52. The inlet ports 50 and outlet ports 52 communicate with the reservoir 48 via channels 54 that are disposed within the reservoir block 38. In one aspect, multiple inlet ports 50 are provided to allow flexibility in connecting the reservoir block 38 to a positive displacement-metering device such as a pump (not shown). As shown, the outlet ports 52 are positioned on the top 40 of the reservoir block 38.

The top 40 includes a sensor bore 56 extending into the body 46. The sensor bore 56 is configured to receive the sensor instrument 22 as will be discussed. As shown in FIG. 6, the sensor bore 56 is internally disposed within the reservoir block 38 wherein the proximity sensor 14 mounts within the sensor bore 56. The proximity sensor 14 electronically connects with and communicates with the displacement-metering device.

The top 40 also includes a recess 58 that extends into the body 46. The recess 58 surrounds the sensor bore 56 and the outlet ports 52 such that sensor bore 56 and the outlet ports 52 open into the recess 58. The recess 58 can have a variety of shapes such as elliptical, oval, circular, triangular, square, rectangular or other appropriate configuration. As shown, the recess 58 has an elliptical shape. The top 40 further includes fastener apertures 60 extending from the top 40 and into the body 46.

Figure 4:
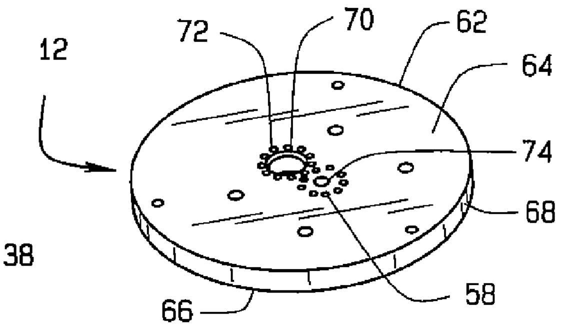
FIG. 4 is a perspective view of the plate of the discharge member of FIG. 1.

Turning to FIG. 4, the discharge member 12 includes a plate 62 having a top surface 64, a bottom surface 66 and sidewall 68 that connect the top surface 64 and the bottom surface 66. The plate 62 can be made from polypropylene, metal or other appropriate material. Further, the plate 62 can have a variety of shapes such as elliptical, oval, circular, triangular, square, rectangular or other appropriate configuration. As shown, the plate 62 has a circular shape. The plate 62 can be of any size to accommodate sensor assemblies 16 of any size. The plate 62 is adapted and configured to attach to the reservoir block 38 as will be discussed (FIGS. 5 and 6).

The plate 62 includes a sensor aperture 70, discharge apertures 72 and a fastener aperture 74 defined therethrough. The sensor aperture 70 is configured to receive the sensor instrument 22. The discharge apertures 72 surround the sensor aperture 70 and fastener aperture 74 in the predetermined pattern.

Figure 5:
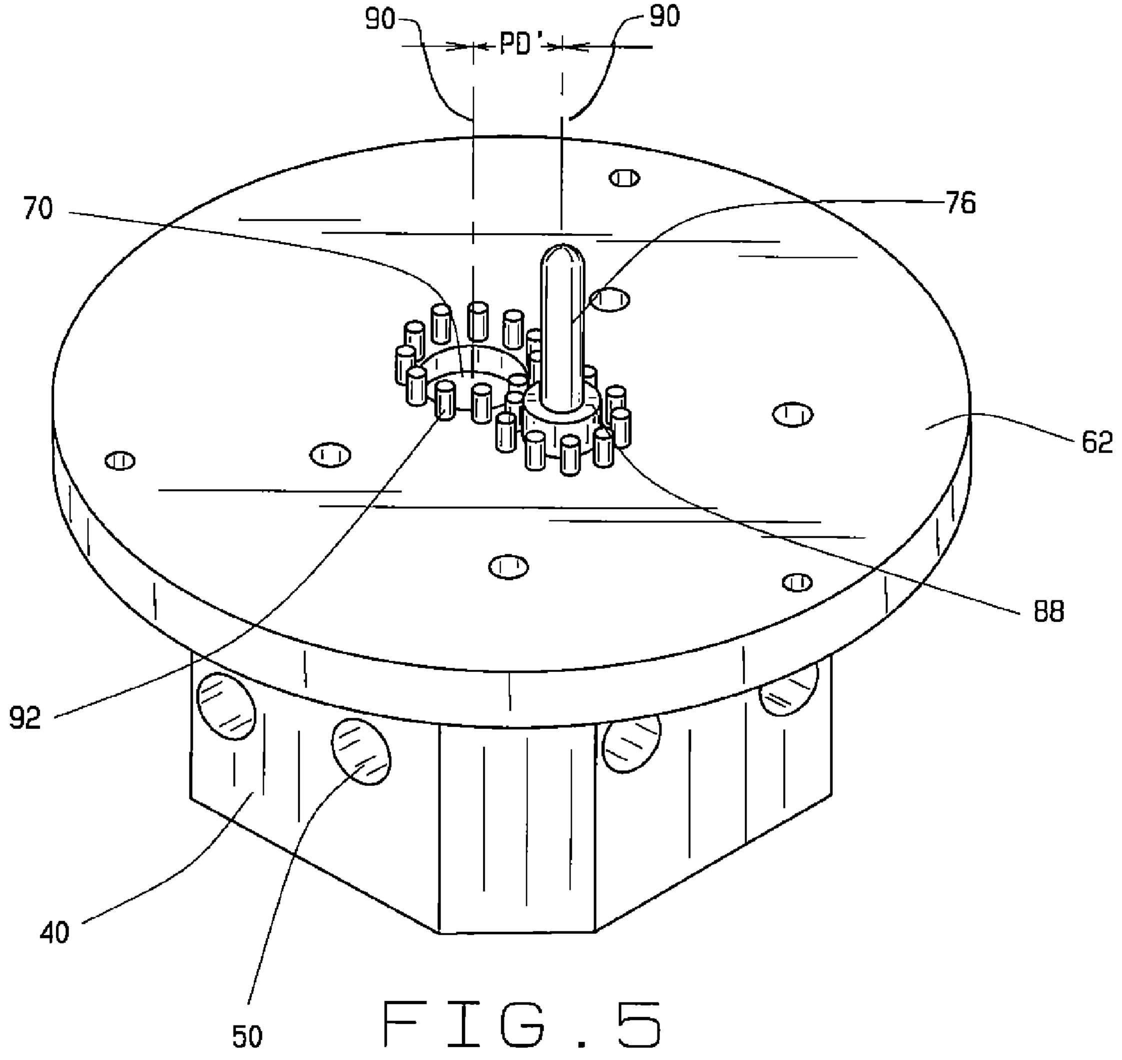
FIG. 5 is a perspective view of the reservoir block and plate connected together illustrating a sensor guide and discharge tubes of the plate.

Referring to FIGS. 5 and 6, the plate 62 also includes a sensor guide 76 that extends from the top surface 64 of the plate 62 at a position adjacent to the sensor aperture 70. The sensor guide 76 is shown to be above the fastener aperture 74. The sensor guide 76 includes a proximal end 78, a distal end 80 and an elongated body 82 disposed between the proximal end 78 and the distal end 80. The elongated body 82 extends outward from the top surface 64 of the plate 62. The elongated body 82 has a tubular outer surface 84 having an outer diameter that is smaller than the inner diameter of the guide aperture 28 (FIG. 2) of the sensor surface 26 wherein the elongated body 82 is configured to pass through the guide aperture 28.

A fastener 86 inserts through the fastener aperture 74 and into the proximal end 78 of the sensor guide 76 to secure the sensor guide 76 to the top surface 64 of the plate 62. Centerlines 90 (FIG. 5) of the sensor aperture 70 and the sensor guide 76 are spaced at a predetermined distance PD' which is substantially equal to the predetermined distance PD (FIG. 2) of the centerlines 30 of the guide aperture 28 and the sensor instrument 22. A base 88 of the proximal end 78 of the sensor guide 76 extends around the elongated body 82 and extends upward from the top surface 64 of the plate 62.

As shown in FIG. 5, discharge tubes 92 of the applicator A attach to the discharge apertures 72 of the plate 62. In one aspect, the discharge tubes 92 press fit into the plurality of discharge apertures 72. The discharge tubes 92 can removably press fit into the discharge apertures 72. Since the discharge tubes 92 connect with the discharge apertures 72, the discharge tubes 92 surround the sensor aperture 70 and the sensor guide 76 in the predetermined pattern.

With reference to FIG. 6, each tube 92 includes an outer wall 94 and an inner wall 96. The outer wall 94 and the inner wall 96 can be tubular shaped. The outer wall 94 and inner wall 96 can have other configurations if desired. The inner wall 96 defines a passageway 98 therein. The passageway 98 is shown to have generally circular smooth cross sectional configuration along the length of the tube 92. At one end 100 of the tube 92, the tube 92 opens out of the bottom surface 66 of the plate 62 and into communication with the recess 58 of the reservoir block 38, wherein the tube end 100 operatively communicates with the outlet ports 52 through the recess 58. The other end 102 of the tube 92 extends outward from the top surface 64 of the plate 62.

During operation, the operator handles the plate 62 which includes the sensor guide 76 and the discharge tubes 92 attached to and extending from the top surface 64. The operator contacts the bottom surface 66 of the plate 62 with the top 40 of the reservoir block 38. In contacting the reservoir block 38 and the plate 62, the operator aligns the sensor aperture 70 of the plate 62 with the sensor bore 56 of the reservoir block 38. Upon alignment of the sensor aperture 70 and sensor bore 56, the plurality of discharge tubes 92 are in fluid communication with the recess 58. In this position, the discharge tubes 92 extend upward from the top surface 64 of the plate 62 and the discharge tubes 92 operatively connect with the reservoir 48 through the outlet ports 52. The operator then connects together the reservoir block 38 and the plate 62 by fasteners F such as screws through the fastener apertures 60 of the reservoir block 38 and the plate 62.

The operator moves the sensor assembly 16 to engage the sensor guide 76. The smaller diameter of the elongated body 82 of the sensor guide 76 inserts into the larger diameter of the guide aperture 28 of the sensor assembly 16 such that the sensor guide 76 mates with the guide aperture 28 during movement of the sensor assembly 16. The operator slides the sensor surface 26 along the sensor guide 76 and downward toward the extended discharge tubes 92. The sensor surface 26 contacts the base 88 of the sensor guide 76. The base 88 stops and supports the sensor surface 26 in a position away from the ends 102 of the discharge tubes 92 which are aligned in the predetermined pattern 38 across from the sensor surface 26. As shown in FIG. 6, a gap 104 exists between the ends 102 of the discharge tubes 92 and the sensor surface 26.

Since the centerlines 30 of the guide aperture 28 and sensor instrument 22 are spaced substantially the same distance PD as the predetermined distance PD' of the centerlines 90 of the sensor aperture 70 and sensor guide 76, the sensor guide 76, when aligned with and inserted within the guide aperture 28, positions the sensor instrument 22 through the sensor aperture 70 and into the sensor bore 56.

This placement of the sensor instrument 22 within the sensor bore 56 by the sensor guide 76 eliminates damage to the sensor instrument 22, since the sensor guide 76 locates the sensor bore 56 for the sensor instrument 22. The sensor guide 76 also directs the sensor instrument 22 into the sensor bore 56 preventing the sensor instrument 22 from contacting components of the plate 62.

The operator then operatively connects the reservoir block 38 with the positive displacement-metering device via one of the inlet ports 50. The displacement-metering device displaces the corrosion preventative 36 into the reservoir 48 by pumping the corrosion preventative 36 through the inlet port 50 and into the reservoir 48.

When the sensor instrument 22 is inserted into the sensor bore 56, the proximity sensor 14 acknowledges the insertion of the sensor instrument 22 within the sensor bore 56. Once the proximity sensor 14 confirms the position of the sensor instrument 22 within the sensor bore 56, the proximity sensor 14 signals the displacement-metering device to pump the corrosion preventative 36 from the reservoir 48 and out of the outlet ports 52. The displacement-metering device continues to pump the corrosion preventative 36 within the recess 58 and through the discharge tubes 92. In response, the discharge tubes 92 deposit controlled amounts or "beads" of the corrosion preventative 36 across the gap 104 and onto the sensor surface 26. The diameter of the ends 102 of the discharge tubes 92 are sized and shaped to dispense the proper amount of the corrosion preventative 36 onto the sensor surface 26.

The operator also controls the volumetric flow of the corrosion preventative 36 via the positive displacement-metering device to uniformly distribute specific metered volumes of the corrosion preventative 36 to the sensor surface 26. Since the discharge tubes 92 are positioned in the predetermined pattern opposite the sensor surface 26, the discharge tubes 92 apply the corrosion preventative 36 to the sensor surface 26 in this predetermined pattern. Accordingly, plate 62 positions the plurality of discharge tubes 92 for a precise location of the "beads" when the pump meters the corrosion preventative 36 from the reservoir block 38. As shown in FIG. 2, the applicator applies the corrosion preventative 36 to the surface of sensor surface 26 in the predetermined pattern. The applicator may apply the corrosion preventative 36 to the perimeter of the sensor surface 26 and to the inner surface of the collar 24 when the collar 24 is utilized.

In one aspect of the present disclosure, the sensor guide 76 removably attaches to the plate 62 to accommodate different types of sensor bodies 18 having a variety of sensor instruments 22 and guide aperture 78. In another aspect, the discharge tubes 92 removably attach to the plate 62 to surround the sensor guide 76 and sensor aperture 70. These removable discharge tubes 92, however, remain in communication with the reservoir 48 when the discharge tubes 92 connect with the plate 62. The removable discharge tubes 92 adapt to a variety of configurations of the sensor instrument 22 and guide aperture 28 of the sensor assembly 16. Therefore, the operator may change the predetermined pattern by selecting and connecting the discharge tubes 92 to the plate 62. In this embodiment, any discharge aperture 72 of the plate 62 that does not connect with any removable discharge tube 62 is capped to prevent application of the corrosion preventative 36 through this respective discharge aperture 72.

In the embodiments, the present disclosure interacts with sensor assemblies, which are robust against environmental effects such as corrosion and are easily serviceable. The applicator of the present disclosure uniformly applies the corrosion preventative, in a controlled manner, to the sensor surface to protect against any corrosive effects. The disclosure also provides various means for attaching the reservoir block and the plate together and means for moving the sensor assembly and applicator across each other.

As previously mentioned, the sensor assembly of the present disclosure may be used for a variety of sensor technologies. For example, the sensor assembly may connect with a bearing arrangement wherein the sensor assembly may be used with all bearing types (not shown). In this example, the sensor instrument monitors a speed variable. One application of this disclosure relates to applying the corrosion preventative to automotive wheel bearings. Aside from coupling the wheel to a component of the suspension system, the bearing assembly generates an electrical signal via the sensor assembly, wherein the generated electric signal represents the angular velocity at which the wheel revolves about the axis. This signal enables a controller in an antilock brake system or traction control system of the vehicle to monitor the angular velocity of the wheel. In this example, the sensor instrument of the sensor assembly mounts and projects into a bearing assembly wherein the sensor instrument detects the speed of the wheel of the vehicle. Accordingly, the applicator of the present disclosure applies the corrosion preventative to the appropriate surface of the sensor assembly and/or to the bearing.

As various changes could be made in the above constructions without departing from the scope of the disclosure, it is intended that all matter contained in the above description or shown in the accompanying drawings shall be interpreted as illustrative and not in a limiting sense.

Moreover, the use of the terms or "upward" or "downward" or "top" or "bottom" or "side" or "inner" or "outer" or "proximal" or "distal" or "block" or "plate" and variations of these terms is made for convenience, but does not require any particular orientation of the components.

The invention claimed is:

1. An applicator that applies a corrosion preventative to a surface of a sensor assembly having a sensor instrument and a guide aperture positioned on the sensor surface, the applicator comprising:

a reservoir block having a top, a bottom and sides connecting the top and the bottom; the top, bottom and sides forming a body that defines an interior reservoir that is configured to contain an amount of the corrosion preventative, the top including a sensor bore extending into the body that is configured to receive the sensor instrument and including an outlet port that is in operative communication with the interior reservoir;

a plate fixed relative to the top of the reservoir block, the plate having a top surface, a bottom surface and sidewalls connecting the top surface and the bottom surface, the plate including a sensor aperture extending through the plate in axial alignment with the sensor bore, and which is configured to receive the sensor instrument, the plate also including a sensor guide that extends outward from the top surface and which is configured to engage the guide aperture of the sensor assembly to axially align the sensor instrument with the sensor bore during placement of the sensor assembly onto the applicator for application of said corrosion preventative;

a plurality of discharge tubes extending from the top surface of the plate in a predetermined pattern adjacent to the sensor aperture and the sensor guide, the discharge tubes opening out of the bottom surface of the plate in operative communication with the outlet port of the reservoir block;

a non-contact proximity sensor positioned at the base of the sensor bore, the non-contact proximity sensor configured to sense and to signal a presence of the sensor instrument when the sensor instrument is positioned through the sensor aperture and seated within the sensor bore, in spaced proximity to the non-contact proximity sensor wherein in response to the signaling of the sensor instrument position within the sensor bore, a controlled amount of the corrosion preventative contained in the reservoir is uniformly discharged through said plurality of discharge tubes onto a portion of the sensor assembly which is adjacent to the sensor instrument and external from said sensor bore.

2. The applicator of claim 1 wherein the top of the reservoir block has a recess that extends into the body of the reservoir block.

3. The applicator of claim 2 wherein the recess surrounds the sensor bore and the outlet port such that the sensor bore and the outlet port open into the recess.

4. The applicator of claim 3 wherein the discharge tubes operatively communicate with the recess.

5. The applicator of claim 1 wherein the sensor guide includes a proximal end, a distal end and an elongated body disposed between the proximal end and the distal end; the proximal end being configured to attach to the top surface of the plate.

6. The applicator of claim 5 wherein the proximal end includes a base that extends outward around the elongated body and extends upward from the top surface.

7. The applicator of claim 6 wherein the base is configured to contact the sensor surface when the sensor guide engages the guide aperture.

8. The applicator of claim 7 wherein the base supports the sensor surface in a position away from the discharge tubes.

9. The applicator of claim 8 wherein the sensor guide removably attaches to the plate.

10. The applicator of claim 1 wherein centerlines of the guide aperture and the sensor instrument are spaced at a predetermined distance and wherein centerlines of the sensor guide and the sensor aperture are spaced at the same predetermined distance.

11. The applicator of claim 10 wherein the sensor aperture aligns with the sensor bore and the sensor guide aligns with the guide aperture when the reservoir block attaches with the plate.

12. The applicator of claim 1 wherein the plurality of discharge tubes are removably attach to the plate.

13. The applicator of claim 1 wherein the reservoir block removably attaches to the plate.

* * * * *